United States Patent Office 3,367,902
Patented Feb. 6, 1968

3,367,902
1,1-DICHLORO-2-VINYL CYCLOPROPANE POLYMER AND A PROCESS FOR POLYMERIZING SAME
Arthur D. Ketley, 5508 Roosevelt St., Bethesda, Md. 20014
No Drawing. Filed Nov. 12, 1965, Ser. No. 507,572
10 Claims. (Cl. 260—33.6)

ABSTRACT OF THE DISCLOSURE

The present invention relates to the formation of a polymer of 1,1-dichloro-2-vinyl cyclopropane by contacting 1,1-dichloro-2-vinyl cyclopropane with a catalytic amount of a catalyst comprised of the reaction product of titanium trichloride and trialkyl aluminum at a temperature in the range of about 0 to 100° C.

---

This invention relates to a process for polymerizing 1,1-dichloro-2-vinyl cyclopropane and to the polymer produced.

1,1-dichloro-2-vinyl cyclopropane is disclosed in U.S. 2,950,328. The polymerization of 1,1-dichloro-2-vinyl cyclopropane by free radical catalysts is disclosed by T. Takahashi et al., Bulletin of Chemical Society of Japan, 37, 131 (1964). Takahashi et al. presented convincing evidence that the resulting polymer had the structure

or

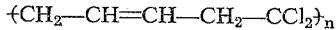

A polymer having either of these structures has certain inherent disadvantages. It is relatively unstable since it contains a significant amount of unsaturation. It also contains allylic chlorine atoms and should lose HCl upon heating. The degradation of polymers containing allylic chlorine atoms is disclosed by Chevassus, F. et al., Stabilization of Polyvinyl Chloride, St. Martins Press, New York, N.Y. (1963).

It is a principal object of the present invention to overcome the aforementioned disadvantages and produce a polymer of 1,1-dichloro-2-vinyl cyclopropane which has good stability.

Briefly stated, the present invention comprises contacting 1,1-dichloro-2-vinyl cyclopropane with a catalytic amount of a catalyst comprised of the reaction product of titanium trichloride and trialkyl aluminum, at a temperature in the range of about 0 to 100° C. to form a solid polymer.

1,1-dichloro-2-vinyl cyclopropane has the following structure:

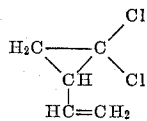

The polymerization catalyst of the instant invention is comprised of the reaction product of titanium trichloride and trialkyl aluminum. It is formed under substantially anhydrous conditions to avoid contamination of the catalyst. Usually, reacting the catalyst components under an atmosphere of a substantially dry inert gas such as nitrogen or argon provides satisfactory conditions.

Representative of the trialkyl aluminum compounds operable in the process of the present invention is trimethyl aluminum, triethyl aluminum, n-propyl aluminum, isopropyl aluminum, n-butyl aluminum and isobutyl aluminum. Triethyl aluminum is preferred because of its high activity and because it is relatively safe to handle.

Generally, the monomer ratio of trialkyl aluminum to titanium trichloride may range from 1:1 to 10:1. A ratio of trialkyl aluminum to titanium trichloride of 2:1 is preferred since it produces the fastest polymerization reaction rate and highest amount of polymer.

The reaction product catalyst may be formed before the polymerization or in situ. The preformed catalyst may be produced by admixing the titanium trichloride and trialkyl aluminum in a substantially inert liquid hydrocarbon such as heptane at room temperatures. To form the catalyst in situ, the titanium trichloride is usually first admixed with a solution of the monomer to form a dispersion and then the trialkyl aluminum is added to the resulting dispersion.

The amount of catalyst used in the instant process is based upon the amount of monomer and may range from about 0.01 to 10 percent by weight of the monomer. Generally, an amount of catalyst in the range from 0.1 to 1.0 percent by weight of the monomer is satisfactory and preferred.

In carrying out the instant process, it is desirable to polymerize the 1,1-dichloro-2-vinyl cyclopropane in the presence of a substantially inert solvent. The solvent is used to control the reaction by maintaining effectively the desired polymerization temperatures. The solvent must be liquid at the temperature of the polymerization reaction. It must also be substantially inert and anhydrous to prevent side reactions. Representative of the solvents which are satisfactory in the present process is pentane, hexane, heptane and octane. Generally, the monomer is used in an amount of 10 to 90 percent by weight of the solvent.

The process of the instant invention should be carried out under substantially anhydrous conditions to avoid side reactions. Any conventional method may be used to provide the desired anhydrous conditions. Usually, carrying out the process under an atmosphere of a substantially dry inert gas such as nitrogen or argon provides satisfactory conditions.

The temperature of the polymerization reaction may range from about 0 to 100° C. At temperatures lower than 0° C., the polymerization process proceeds at a rate which is too slow to be practical. At temperatures higher than 100° C., the catalyst degrades. A temperature range of 30 to 60° C. is satisfactory and preferred.

The pressure of the polymerization reaction may range from 0.1 to 100 atmospheres. Atmospheric pressure however is preferred.

The time required to carry out the polymerization reaction will depend upon the specific reaction conditions.

The solid polymer of 1,1-dichloro-2-vinyl cyclopropane produced according to this invention can be used in a number of applications. Since the instant polymer is soluble in hydrocarbons such as benzene, it can be easily cast into films from solution. It is especially suitable for use as a protective coating of film since it is substantially inert to the action of acids and bases.

All parts and percentages used herein are by weight unless otherwise indicated.

This invention is further illustrated by the following examples.

Example 1

A glass micro reactor was fitted with a stirrer and a source of dry helium. The reactor was flushed with the dry helium and heated to a temperature of 50° C. An atmosphere of dry helium was maintained throughout the reaction to provide anhydrous conditions.

5 ml. of 1,1-dichloro-2-vinyl cyclopropane were added to the reactor along with 25 ml. of dry n-heptane.

0.4 g. of titanium trichloride was added to the reactor with stirring. A solution comprised of 1.5 ml. of dry n- heptane and 2.53 millimoles of triethyl aluminum (1.69 millimole of triethyl aluminum per milliliter of n-heptane) was then added to the reactor with stirring. The reaction was allowed to run at a temperature of 50° C. for 18 hours.

At the end of this time, an excess amount of methanol was added to the reactor to precipitate the polymer and to deactivate the catalyst. The polymer precipitated out as a brown powder. The polymer was recovered and dried in a vacuum oven at room temperature for 6 hours. The dried polymer weighed 1.7 g.

The polymer was admixed with benzene at room temperature. A major amount of the polymer dissolved in the benzene. The solution of benzene and polymer was separated from the insoluble residue and the solution was then admixed with methanol to reprecipitate the polymer. The reprecipitated polymer was recovered and dried in a vacuum oven at room temperature for 16 hours. The dried polymer weighed 1.1 g.

The reprecipitated dried polymer was redissolved in benzene and reprecipitated with methanol two additional times. The resulting polymer was dried in a vacuum oven at room temperature for 6 hours. The dried solid polymer was a light tan color and had a number average molecular weight of 3700 as measured by osmometry on a Mechrolab Vapor Pressure Osmometer. The number average molecular weight of the polymer is defined in "Principles of Polymer Chemistry" by Flory (Cornell University Press).

The polymer was subjected to infrared analysis on a Perkin-Elmer Spectrometer, Model 221. The infrared spectrum showed no band at 1020 cm.$^{-1}$ which indicates that the polymer contained no cyclopropyl groups.

Heat was applied to the polymer. It showed some decomposition at a temperature of about 230° C. but no sign of melting was observed up to a temperature of 300° C.

*Example 2*

In this example, poly 1,1-dichloro-2-vinyl cyclopropane was produced in substantially the same manner as disclosed in Example 1.

2.5 g. of this polymer were dissolved in 10.0 ml. of benzene at room temperature. The resulting solution was coated on a clean surface of a glass plate and also on clean surfaces of aluminum, copper and stainless steel. The coated surfaces were allowed to dry at room temperature. The resulting dry coatings were continuous, smooth and adhered well to the glass and metal surfaces.

The coatings were stripped from the surfaces. The resulting films were brittle.

One of the films was immersed in sulfuric acid and another of the films in concentrated hydrochloric acid at room temperature for 4 hours. At the end of this time, substantially no deterioration of the films was observed.

*Example 3*

In this example, the polymer of 1,1-dichloro-2-vinyl cyclopropane was produced in substantially the same manner as disclosed in Example 1. Two accurately weighed samples of the polymer were tested to determine their chloride content.

Each polymer sample was combusted in a Schoniger oxygen flask according to the technique set forth in Martin, A. J. and Deveraux, H., Anal. Chem., 31, 1932 (1959). The resulting solution was titrated for chloride by a modified Volhard procedure according to the technique set forth in McKittrick, D. S. and Schmidt. C.L.A., Arch. Biochem. 6, 273 (1945); and Kolthoff, I. M. and Stenger, V. A., Volumetric Analysis, vol. II, p. 262, Interscience Publishers Inc., N.Y. (1947).

The chlorine content of one sample was determined to be 25.7% and the second sample had a chlorine content of 25.9%.

*Example 4*

Poly 1,1-dichloro-2-vinyl cyclopropane was produced substantially according to the procedure set forth in Example 1. The degree of unsaturation of this polymer was measured by quantitative bromination.

An accurately weighed sample of the poly 1,1-dichloro-2-vinyl cyclopropane was dissolved in 50 ml. of carbon tetrachloride. 25.00 ml. of standard 0.2 N bromine in carbon tetrachloride was added to the resulting solution to brominate the dissolved polymer. Bromination was allowed to continue for 45 minutes. At the end of this time, aqueous potassium iodide was added to the polymer solution, and the iodine which was liberated was titrated with standard N/10 sodium thiosulfate. Blanks were also carried through this procedure.

It was determined that the dissolved polymer consumed 10.9 milliequivalents of bromine per gram of polymer.

To correct for bromine consumed via substitution reaction, phenolphthalein was added to the solution after the thiosulfate titration, and the resulting liberated hydrogen bromide was titrated. This titration determined the acidity to be 2.73 milliequivalents/g.

Based on these measurements, the amount of carbon-carbon unsaturation was determined by the following equation:

Unsaturation, milliequiv./g.=Bromine consumed, milliequiv./g.-2 (acidity, milliequiv./g.)

The unsaturation was calculated to be 5.44 milliequiv./g.

Since two bromines are required per double bond, that would constitute two equivalents or 2000 milliequivalents. The equivalent weight was determined then according to the following equation:

$$\frac{2000 \text{ milliequivalents}}{\text{unsaturation, milliequiv./g.}} = \text{equivalent weight}$$

The equivalent weight was calculated to be 366 which is an average of 1 double bond per unit molecular weight of 366. The unsaturation data is consistent with a polymer in which, on the average, there are 10 double bonds for every 36 monomer units. Based on the proposed structure, these 36 monomer units would contain 26 chlorine atoms. The chlorine content calculated on this hypothesis is 25.6%. This is in agreement with the measured value.

The foregoing analyses of the polymer produced according to the process of the instant invention show that it contains repeating units having a structure as follows:

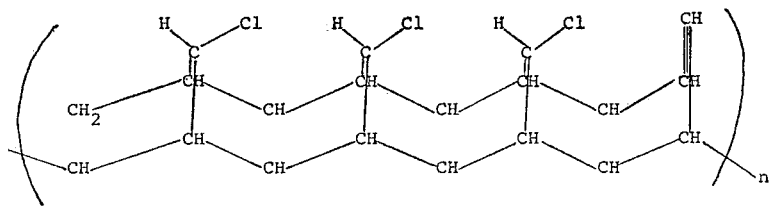

where *n* is an integer having a value which produces a solid polymer. Preferably, *n* has a value of at least 3 to form a coherent film.

What is claimed is:

1. A process for polymerizing 1,1-dichloro-2-vinyl cyclopropane which comprises contacting the 1,1-dichloro-2-vinyl cyclopropane with at least a catalytic amount of a catalyst comprised of the reaction product of trialkyl aluminum and titanium trichloride at a temperature in the range of about 0 to 100° C. to form a solid polymer.

2. A process according to claim 1 wherein the reaction product is formed from a molar ratio of trialkyl aluminum to titanium trichloride of 1:1 to 10:1.

3. A process according to claim 1 wherein the trialkyl aluminum is selected from the group consisting of trimethyl aluminum, triethyl aluminum, n-propyl aluminum, isopropyl aluminum, n-butyl aluminum and isobutyl aluminum.

4. A process according to claim 3 wherein the trialkyl aluminum is triethyl aluminum.

5. A process according to claim 1 wherein the temperature is 50° C.

6. A process according to claim 1 wherein the 1,1-dichloro-2-vinyl cyclopropane is polymerized in the presence of a solvent.

7. A process according to claim 6 wherein the solvent is a member of the group consisting of pentane, hexane, heptane and octane.

8. A hompolymer composition having the following recurring structural units:

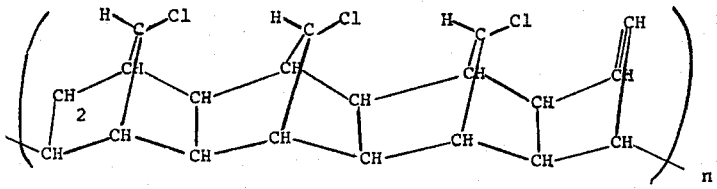

wherein *n* is an integer having a value of at least 3.

9. A coating solution comprising the polymer of claim 8 and a liquid hydrocarbon.

10. A film deposited from the solution of claim 9.

References Cited

UNITED STATES PATENTS

| | | | |
|---|---|---|---|
| 2,920,062 | 1/1960 | McFarland | 260—33.6 |
| 2,981,756 | 5/1961 | Neureiter | 260—91.5 |
| 3,223,686 | 12/1965 | Natta et al. | 260—33.6 |
| 3,309,346 | 3/1967 | Coover et al. | 260—94.9 |

OTHER REFERENCES

Chemical Abstract, volume 63, 10072h–10073b.

MORRIS LIEBMAN, *Primary Examiner.*

S. L. FOX, *Assistant Examiner.*